United States Patent [19]
Crystal

[11] 3,901,151
[45] Aug. 26, 1975

[54] PROCESS FOR PREPARING WATERLESS LITHOGRAPHIC MASTERS

[75] Inventor: Richard G. Crystal, Dallas, Tex.

[73] Assignee: Xerox Corporation, Stamford, Conn.

[22] Filed: Dec. 27, 1973

[21] Appl. No.: 428,964

[52] U.S. Cl. .................. 101/463; 101/401.1; 117/6; 117/62.1; 117/161 ZA; 156/4
[51] Int. Cl.² .......................... B41C 1/10; C08J 5/24
[58] Field of Search ........................ 101/128.2–128.4, 455, 463, 466, 467, 470, 471, 395, 401.1, 426; 156/4, 5; 117/6, 35.5, 38, 62.1, 161 ZA, 132 BS; 96/35, 36, 36.2–36.4

[56] References Cited
UNITED STATES PATENTS

| | | | |
|---|---|---|---|
| 2,708,289 | 5/1955 | Collings | 117/161 ZA |
| 3,639,155 | 2/1972 | Hartline et al. | 117/161 ZA |
| 3,682,633 | 8/1972 | Curtin | 101/463 |

*Primary Examiner*—Clyde I. Coughenour
*Attorney, Agent, or Firm*—James J. Ralabate; James P. O'Sullivan; Donald M. MacKay

[57] ABSTRACT

A process for preparing a waterless lithographic printing master is provided. A suitable substrate, which is preferably ink accepting is first coated with a curable silicone which is curable at low or elevated temperature and a second different curable silicone deposited on said first silicone which can be preferentially cured at a lower temperature without curing the first silicone and which second silicone contains, in addition to its own catalyst, an amount of high temperature curing catalyst sufficient to cure the underlying silicone. The surface silicone is then preferentially cured at least on its surface to render it nontacky, but not the underlying silicone. A particulate image pattern is deposited on the surface cured silicone which pattern comprises a material which selectively inactivates the curing catalyst and combines with the catalyst to degrade the cured silicone below said image pattern at elevated temperature, the underlying silicone cured in the non-imaged areas to an elastomeric ink releasable condition, as well as the surface layer to the extent that it was not previously rendered ink releasing, and the particulate image pattern and preferably the degraded and uncured silicones removed beneath said pattern to reveal the ink accepting substrate in image configuration.

12 Claims, No Drawings

PROCESS FOR PREPARING WATERLESS LITHOGRAPHIC MASTERS

BACKGROUND OF THE INVENTION

This invention relates to a novel method for preparing waterless lithographic printing masters, particularly of the planographic type, to a novel master and to a method for printing from said master.

In conventional lithography an aqueous fountain solution is employed to prevent the ink from wetting the non-imaged areas of the planographic plate. It has recently been discovered that the requirement for a fountain solution can be obviated by employing a planographic plate having a silicone, i.e., organopolysiloxane, elastomeric layer. Because the silicone is not wetted by the printing ink, no fountain solution is required. While the use of silicone elastomers as a printing surface has obviated the requirement for a fountain solution, it has been found that finely divided particulate material commonly referred to in the trade as "toner," is not easily attached to the silicone. Thus, the adhesive or non-adhesive property of the silicone which renders it useful for rejecting lithographic inks, also causes it to reject other materials such as toner. Accordingly, it has been difficult to prepare a printing master in which the toner could be sufficiently attached to the silicone such that it would not become removed after a short run on a printing press. It is this problem to which this invention is directed.

BRIEF DESCRIPTION OF THE INVENTION

It has now been discovered that a particulate image need not be adhered to a silicone elastomer to provide a long-lasting waterless lithographic plate. More particularly, it has been found that a normally ink releasing silicone can be imaged and rendered ink accepting or the ink releasing silicone removed from a suitable ink accepting substrate in image configuration to permit printing from said substrate. In addition, a method of printing and a novel non-imaged waterless lithographic master are provided.

The process for preparing the printing master comprises coating a suitable substrate, which is preferably ink accepting, with a low temperature or elevated temperature curable silicone, depositing on said curable silicone a second different curable silicone which can be preferentially cured at a lower temperature without curing the first silicone and which second silicone contains, in addition to its own catalyst, an amount of high temperature curing catalyst sufficient to cure the underlying silicone, preferentially curing the surface silicone, at least on its surface to render it nontacky, but not the underlying silicone, depositing a particular image pattern on the cured silicone, said pattern comprising a material which selectively inactivates said high temperature curing catalyst and combines with said catalyst to degrade the cured silicone below said image pattern at elevated temperature, curing the underlying silicone in the non-imaged areas to an elastomeric ink releasable condition as well as the surface layer to the extent that it was not previously rendered ink releasing, and removing the particulate image pattern to reveal an ink accepting silicone having a rough topography. In a preferred embodiment, both the particulate image pattern and the underlying degraded and uncured silicones are removed to reveal an ink accepting substrate. The method of printing comprises inking the resultant master and transferring the inked imaged to a receiver member. The novel non-imaged waterless lithographic master comprises a suitable substrate to which is adhered a curable silicone layer and a different cured silicone surface layer adhered to said curable silicone layer, said cured silicone containing an amount of curing catalyst sufficient to cure the underlying silicone.

DETAILED DESCRIPTION OF THE INVENTION

Substrates which can be employed for the printing master are those self-supporting materials to which the silicone can adhere and be compatible therewith as well as possess sufficient heat and mechanical stability to permit use under widely varying conditions and in a preferred embodiment of the invention be ink accepting. Exemplary of suitable substrates are paper; metals such as aluminum; and plastics such as polyester polycarbonate, polysulfone, nylon and polyurethane.

Ink releasable silicones which can be employed in the invention include silicone polymer gums and heterophase polymeric compositions having a silicone phase such as organopolysiloxane copolymers including block copolymers, graft and segmented copolymers, organopolysiloxane polymer blends, and copolymer stabilized polymer blends. The silicones employed in the two layers should be of different types to permit preferential curing of the surface silicone. For example, a silicone which is curable at ambient or low temperature can be overcoated on a silicone curable only at a higher temperature, and the surface silicone preferentially cured. Thus, the silicone employed to coat the substrate can be a thermally curable silicone homopolymer or copolymer curable at elevated temperature and the surface silicone, a room temperature vulcanizable silicone. In this manner, the surface silicone can be cured at room temperature, the particulate image deposited thereon and the underlying silicone cured at elevated temperature.

Exemplary of suitable silicone gums are those having only methyl containing groups in the polymer chain such as polydimethylsiloxane; gums having both methyl and phenyl containing groups in the polymer chain as well as gums having both methyl and vinyl groups, methyl and fluorine groups, or methyl, phenyl and vinyl groups in the polymer chain.

Typical silicone gums which are of the thermally curable type suitable for use in the invention as elevated temperature gums are Syl Gard No. 182, Syl Off No. 22 and No. 23 manufactured by Dow Corning, Midland, Mich.; Y–3557 and Y–3602 silicone gum available from Union Carbide Company, New York, N.Y., as well as No. 4413 silicone and No. 4427 heat curable silicone gums available from General Electric Company, Waterford, N.Y. The Y–3557 and Y–3602 gums specifically have aminoalkane crosslinking sites in the polymer backbone which react with a diisocyanate crosslinking agent over a wide range of temperature and time to produce a durable, ink releasable elastomeric film. The aforesaid gums do not contain a catalyst.

Exemplary of suitable room temperature vulcanizable gums which can be cured at ambient temperature and atmospheric conditions include RTV–108, 106 and 118 polydimethylsiloxane gums available from General Electric Company;

Catalysts suitable for the low temperature vulcanizable (LTV) silicone gums or the gums curable at ambient or room temperature (RTV) depend upon the type of gum employed and are supplied by the manufacturer of the gum. Typical catalysts are amines and carboxylic acid salts of many metals such as lead, zirconium, zinc, antimony, iron, cadmium, tin, barium, calcium, and manganese, particularly the napthanates, octoates, hexoates, laurates and acetates. Tin (II) octoate and dibutyl tin dilaurate with a chloroacetic acid have been widely used. Gums which react at room temperature (RTV types) can be adjusted to vulcanize at only slightly elevated temperatures (LTV types) by the choice of suitable combinations of cross-linking agent and catalyst but also by absorbing the catalyst in a zeolite (molecular sieve). It is then inactive at room temperature and is activated by heating. Typical LTV types are cured at temperatures between 50° and 80°C.

The conventional silicone types which are cured at elevated temperature by means of peroxide catalysts require a temperature of about 100°C to as high as 200°C or more. The particular catalyst and temperature employed, however, will depend on the particular type of silicone as is well known to those skilled in the art. The gums curable at elevated temperature are characterized by extremely high molecular weights of from about 300,000 to 700,000 while the types curable at room or low temperature have molecular weights of between about 10,000 and 100,000. Since the mechanical properties of a vulcanizate are affected by the molecular weight of the gum, that is the strength improves with increasing molecular weight, the gums curable at elevated temperature have in most cases better strength.

Ink releasable copolymers which can be employed and coalesced at elevated temperature comprise heterophase polymeric compositions consisting of an organopolysiloxane material and a nonsilicone polymeric material. Polymeric materials which can be employed as the non-silicone component of the heterophase polymeric composition include materials such as poly($\alpha$-methylstyrene), polycarbonate, polysulfone, polystyrene, polyester, polyamide, acrylic polymers, polyurethane, and vinyl polymers. The present invention is not intended to be limited by the material for this nonsilicone phase.

While not limiting, preferred proportions for the heterophase polymeric composition comprise a ratio by weight of between about 95 to 50 parts organopolysiloxane to 5 to 50 parts of the nonsilicone polymeric phase. This ratio range of organopolysiloxane to nonsilicone polymer, provides suitable ink release materials for the ink release layer of the instant printing master. Copolymers of the above type, could be typically prepared in a manner as is illustrated by the procedure for preparation of an organopolysiloxane polystyrene block-copolymer as described in Macromolecules, Volume 3, January-February 1970, pages 1–4.

The silicones can be applied to the substrate by conventional techniques such as solvent casting techniques including dip coating or draw bar coating, etc., after dissolution in organic solvents which typically may be solvents such as benzene, hexane, heptane, tetrahydrofuran, toluene, xylene, as well as other common aliphatic and aromatic solvents.

The thickness of the coating will depend on the type of silicone and catalyst employed. Generally, the silicone coating should be between 1 and 15 microns thick. A preferred range is between 2 and 8 microns, with an optimum of about 2 microns for the surface silicone and 5 microns for the underlying silicone. A silicone surface layer which is quite thin is more easily degraded by the conventional toners, and the surface silicone need only be thick enough to cover the gummy uncured silicone and protect it from contamination before imaging. The underlying silicone, however, should be sufficiently thick such that the combined silicones in the nonimage areas can withstand extended periods on the printing press. The catalyst employed in the surface silicone to cure the underlying layer will depend on the type of gum employed as is well known to those skilled in the art. The catalyst employed must be one which will permit preferential curing of the surface layer by its own catalyst. Further, it must be a material which will diffuse into the underlying silicone layer and cure said underlying silicone layer except where it is inactivated by the particulate image pattern.

Suitable high temperature catalysts for the silicone gums curable at elevated temperature which can be employed and which will react with the particulate imaging material to degrade the silicone and be rendered inactive by said imaging material include the diaroyl peroxides such as dibenzoyl peroxide, di-p-chlorobenzoyl peroxide and bis-2,4-dichlorobenzoyl peroxide. Other catalysts include the dialkyl peroxides such as di-t-butyl peroxide and 2,5-dimethyl-2,5-di-(t-butylperoxy)-hexane. Diaralkyl peroxides such as dicumyl peroxide, and alkyl aralkyl peroxides such as t-butyl cumyl peroxide can be employed, as well as blocked diioscyanates. Other catalysts which can be employed include the azo compounds such as azo-bis-isotutyronitrile as well as other conventional free radical catalysts. The "high temperature" catalysts are those which are activated at elevated temperature such as between about 100°C and 200°C or more. The amount of catalyst employed will depend on the silicone employed but with the preferred peroxide catalysts such as 2,4-dichlorobenzoyl peroxide, best results are obtained in a catalyst concentration of between 3 and 5 percent by weight of solids in the gum or polymer.

The particulate image pattern can be deposited by conventional techniques such as electrophotography, electrostatic printing, photoelectrophoresis and electrographic imaging. The particulate image is preferably developed on a separate photoconductive surface and electrostatically transferred to an intermediate member before transfer to the silicone gum. The means of development of the image will be dictated by the particular image technique, but insofar as conventional xerography is employed the image can be developed by cascade, magnetic brush and powder cloud development methods.

The particulate material or toner used to form the image should be one which will inactivate the catalyst contained in the surface silicone and also degrade said silicone. Conventional toners which will degrade typical polydimethylsiloxane cured polymers such as RTV polymers and also inactivate conventional peroxide catalysts include thermoplastic polymers such as polymers of styrene Typical styrene polymers include polystyrene, styrene/n-butylmethacrylate copolymer and styrene-butadiene copolymer. Other materials which can be employed include: polyethylene, polypropylene, ethylene-vinyl acetate copolymers, propylene-modified polyethylene, acetals, acrylics, acrylonitrile-butadienestyrene (ABS), polystyrene, cellulosics, chlorinated polyether, fluoro-chemicals, polyamides (nylons), polyimides, phenoxies and vinyls. It is only necessary that the toner inactivate the catalyst and degrade the cured surface silicone or combine with the catalyst to degrade the cured surface silicone, and thus a number of materials can be employed. Typical solvents which can be employed to remove the particulate toner and the degraded and uncured silicones below said toner include aliphatics such as hexane; aromatics such as toluene and xylene and chlorinated solvents such as chloroform and tetrachlorethylene. One or more solvents may be required to remove both silicones and the toner to reveal the ink accepting substrate. The selection of solvents depends upon the particular toner and silicones employed.

In a preferred embodiment, the resultant master is subjected to a post-baking step after removal of the toner and the underlying silicones which serves to insure the silicone is fully cured around the image areas and thus lengthen the life of the master.

Typical inks can be employed in the printing method of the invention to include inks of the oleophilic type having the vehicle component for the ink pigments derived from various oleophilic materials such as aromatic and aliphatic hydrocarbons drying oil varnishes, lacquers, and solvent type resins. Other suitable inks include the glycol and rubber based inks.

The "imaged" printing master can thereafter be employed in a planographic printing operation, including direct or offset lithography with the dampening system removed, to provide good quality prints over an extended period of operation.

The following examples will serve to illustrate the invention and embodiments thereof. All parts and percentages in said examples and elsewhere in the specification and claims are by weight unless otherwise specified.

EXAMPLE I

A printing master is prepared as follows. A smooth aluminum sheet 11 × 15 inches is coated with a 5 micron thick layer of uncured polydimethylsiloxane gum manufactured by Dow Corning Corporation and sold under the designation Silastic 430. The gum was dissolved in a 5 percent by weight solution of hexane and applied to the aluminum substrate with a wire wound draw bar. The sheet was then allowed to dry at room temperature to evaporate the solvent from the gum. A second silicone gum is then draw bar coated over the dried silicone to a thickness of 2 microns. The second solution comprises an equal by weight mixture of RTV polydimethylsiloxane gum (General Electric RTV 118) and dichlorobenzoyl peroxide catalyst (General Electric TS–50) (10 percent total solids in heptane). The RTV gum contains its own catalyst and thus the peroxide catalyst is for curing the underlying silicone at elevated temperature. The upper layer is then fully cured in air by allowing the coated sheet to remain at room temperature for 24 hours. An electrostatographic latent test image was then deposited and cascade developed on a paper using the Xerox Model D Processor, and the particulate image pattern electrostatically transferred to the cured silicone. The particulate image pattern was developed with Xerox 3600 toner containing styrene/n-butylmethacrylate copolymer. The resultant imaged sheet was then placed in an air circulating oven for 2 minutes at a temperature of 160°C to cure the underlying silicone in the nonimaged areas. The elevated temperature activates the catalyst which diffused down from the surface layer. The particles from said particulate image pattern and the silicones below said pattern were then removed by wiping first with acetone to remove the toner followed by heptane to remove the uncured and degraded silicones. It was found that the toner and catalyst selectively degraded the cured silicone surface layer as well as inhibited the curing of the underlying silicone gum. The resultant printing master was then mounted on a printing press in both the direct and offset modes and 500 copies of good image contrast were obtained employing a conventional lithographic ink (Pope and Gray No. 2441) and no fountain solution. There was no detectable wear or background buildup with the use of the master.

EXAMPLE II

The procedure of Example I is repeated but for the exception that chloroform is employed to remove both the silicones and the toner. Similar results are obtained.

EXAMPLE III

The process of Example I is repeated but for the exception that benzoyl peroxide is substituted for 2,4-dichlorobenzoyl peroxide. Similar results are obtained.

EXAMPLE IV

In accordance with the procedure of Example III, a printing master was prepared in which the imaged cured plate was washed only with acetone, a solvent for the toner, resulting in silicone ink accepting imaged areas having a rough topography. The resultant master was inked and prints of good quality were obtained from it.

EXAMPLE V

The procedure of Example I is repeated but with the exception that after removal of the toner and the uncured gum below the toner, the imaged master is subjected to a post-baking step of 30 seconds at 130°C in an air circulating oven. It was found that the silicone was strengthened such that the life of the master is extended on a printing press.

EXAMPLE VI

The procedure of Example I is repeated but with the exception that a styrene-butadiene block copolymer is employed as the toner.

EXAMPLE VII

The prodecure of Example I is repeated but for the exception that a polystyrene is employed as the toner. Copies of good image contrast are obtained.

EXAMPLE VIII

The procedure of Example I is repeated but for the exception that polyethylene is employed as the toner. Copies of good image contrast are obtained.

Having described the present invention with reference to these specific embodiments, it is to be understood that numerous variations may be made without departing from the spirit of the present invention and it is intended to encompass such reasonable variations or equivalents within its scope.

What is claimed is:

1. A process for preparing a printing master comprising:
   a. providing a suitable substrate,
   b. coating said substrate with an elevated temperature or low temperature curable silicone,
   c. depositing on said curable silicone a second curable silicone which can be preferentially cured at a lower temperature without curing the first silicone and which second silicone contains, in addition to its own catalyst, an amount of high temperature curing catalyst sufficient to contact and cure the underlying silicone,
   d. preferentially curing the surface silicone, at least on its surface to render it nontacky, but not the underlying silicone,
   e. depositing a particulate image pattern on the cured silicone said pattern comprising a material which selectively inactivates said high temperature curing catalyst and combines with said catalyst to degrade the cured silicone below said image pattern at elevated temperature,
   f. curing the underlying silicone in the nonimaged areas to an elastomeric ink releasable condition as well as the surface layer to the extent that it was not previously rendered ink releasing, and
   g. removing the particulate image pattern to reveal an ink accepting silicone having a rough topography.

2. The process of claim 1 wherein the substrate is ink accepting and the particulate image pattern and both underlying silicones are removed to reveal the ink accepting substrate.

3. The process of claim 1 wherein the surface silicone contains a peroxide catalyst.

4. The process of claim 2 wherein the surface silicone contains a peroxide catalyst.

5. The process of claim 1 wherein the underlying silicone is cured at elevated temperature, and the surface silicone is cured at ambient temperature.

6. The process of claim 2 wherein the underlying silicone is cured at elevated temperature, and the surface silicone is cured at ambient temperature.

7. The process of claim 2 wherein after removal of the particulate image pattern and underlying silicone, the resultant master is subjected to a post-baking step.

8. The process of claim 1 wherein after removal of the particulate image pattern, the resultant member is subjected to a post-baking step.

9. The process of claim 1 wherein after removal of the particulate image pattern, the resultant master is inked, and the inked image transferred to a receiver member.

10. The process of claim 2 wherein after removal of the particulate image pattern and underlying silicones the resultant master is linked and the inked image transferred to a receiver member.

11. The process of claim 1 wherein the high temperature catalyst is a free radical catalyst.

12. The process of claim 2 wherein the high temperature catalyst is a free radical catalyst.

* * * * *